United States Patent Office 3,012,184
Patented Dec. 5, 1961

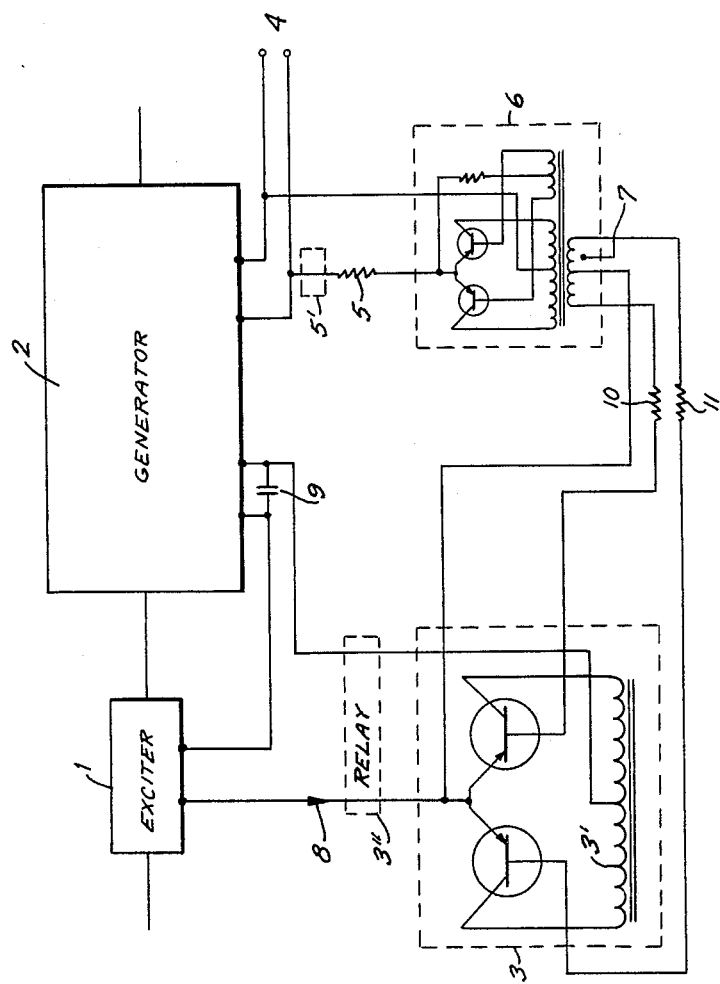

3,012,184
TRANSISTOR-CONTROLLED OUTPUT REGULATOR ARRANGEMENT FOR DIRECT CURRENT AND ALTERNATING CURRENT CIRCUITS
Otto Kreutzer, Wollmatinger Strasse 40, Konstanz, Germany
Filed Feb. 19, 1960, Ser. No. 10,001
3 Claims. (Cl. 322—17)

The present invention concerns a transistor-controlled current or voltage regulation of direct current and alternating current circuits.

Devices for current or voltage regulation are well known. Such arrangements operate by means of carbon regulators or of relays which serve to connect or disconnect the required resistors arranged in the exciter circuits of generators whereby the desired voltage regulation is effected. It is also known to carry out a current or voltage regulation by means of resistors which are current- or voltage-responsive.

While mechanically operated regulator arrangements are well suited for controlling high electric power, the regulation of small electrical energies has been carried out successfully by means of current- or voltage-dependent resistors. However, all these known regulator arrangements entail the disadvantage that electrical energy is transformed through ohmic resistance into heat or has to be consumed entirely in such resistors. In addition, the mechanically operated regulator arrangements have the further disadvantages that they are subject to substantial wear which causes changes of the regulator characteristic and, therefore, requires continuous maintenance of such arrangements.

It is a main object of the present invention to overcome all the above mentioned disadvantages of known regulating equipment.

It is a further object of this invention to provide for a regulator arrangement which operates practically without losses i.e. without development of heat.

Further objects of this invention will become apparent from the following description.

With above objects in view a transistor-controlled output regulator arrangement, according to this invention, for direct current and alternating current circuits, comprises, in combination, electric energy output means having output terminals; first inverter means including at least one transistor connected with said output terminals and capable of producing a frequency depending on the characteristics of the output energy appearing at said output terminals; control circuit means connected with said energy output means for applying thereto a control current adapted to influence said characteristics of said output energy; second inverter means including at least one transistor connected with its output in said control circuit means for furnishing said control current and having control elements connected with the output of said first inverter means for regulating said control current depending upon said frequency produced by said first inverter means; and a frequency-dependent control element connected in the alternating current circuit of one of said inverters.

A particular advantage obtained by the regulator arrangement according to the invention consists in the fact that the transistors used in the arrangement can be used and connected to serve as switching transistors, i.e. they can be controlled to full extent rapidly by means of a rectangular voltage and therefore practically eliminate heat losses. Since the regulation is effected by means of inductive or capacitive impedance members no electrical losses appear in the control or exciter circuit which serves to greatly improve the electrical efficiency. By utilizing high frequencies the regulator arrangement can be kept within very small dimensions. Also, it can be constructed as a compact unit and can be mounted in any place because there is practically no heat developed thereby. Moreover, the transistor-controlled regulator arrangement according to the invention operates entirely without any inertia so that the effect of the control operation takes place immediately without any fluctuation phenomena.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

In the illustrated example, an exciter generator 1 generates an exciter current 8 for a direct current or alternating current generator 2, the exciter current 8 being transmitted to the latter via a transistor-type inverter 3. If it is intended in this example to maintain the output voltage 4 of the generator 2 at a constant value, then said output voltage 4 is applied to a second transistor-type inverter 6 via a voltage-dependent resistor device 5. It is well known that the pulsation frequency of a transistor-type inverter varies practically in proportion with its input voltage. The voltage-dependent resistor device 5 causes comparatively substantial voltage variations in the transistor-type inverter 6 upon the appearance of rather small voltage fluctuations of the output voltage 4. Instead of a voltage-dependent resistor device 5 it is also possible to use, for instance, a controllable semi-conductor.

The function of the transistor-type inverter 6 is the following one: by means of an alternating current output voltage 7 varying considerably in frequency it has to determine the pulsation frequency of the first mentioned transistor-type inverter 3. It is evident for those skilled in the art, that this can be accomplished.

As the pulsation frequency of the transistor-type inverter 3 varies, also the inductive voltage drop varies in proportion to that pulse frequency, i.e. in such a manner that the exciter current 8 will be caused to vary considerably in the desired manner.

For instance, if the output voltage 4 drops, the input voltage of the inverter 6 also is reduced so that the inverter 3 starts to operate with a lower pulse frequency. This results in a smaller inductive voltage drop across the transformer 3' of the inverter 3 through which the exciter current 8 is supplied to the generator 2, and therefore the exciter current 8 is increased whereby the generator 2 is excited to a greater degree. Consequently, the output voltage 4 immediately increases to the desired value thereof.

If, on the other hand, the output voltage 4 increases, the above mentioned effects are reversed. In connection with this mode of operation it is advisable to select the operational frequency of the regulator arrangement as high as possible so that even a comparatively small smoothing condenser 9 will be sufficient to prevent the pulsation of the direct current from having a disadvantageous effect on the generator 2.

In case the output voltage 4 is an alternating current voltage then e.g. an additional unit 5' may be provided, containing a small transformer and a rectifier with a smoothing condenser, for producing a suitable direct current for the voltage-dependent resistor device 5 and for the transistor-type inverter 6. A frequency-dependent influence on this arrangement may also be obtained by inserting a tuned oscillator circuit.

It is further advisable to keep the basis current for the transistor-type inverter 3 at a constant level by means of special resistors 10 and 11. Moreover, it is advantageous to connect a condenser in parallel or in series with the inductivity i.e. the transformer 3' of the inverter 3 whereby a particularly efficient regulation can be effected on account of the appearing resonance frequency. Instead of the inductivity also a capacity may be provided so that the voltage drop would be of capacitive nature.

In order to reach rapidly a desired output voltage 4 after the start of the machine set it is advisable to provide in the circuit of the exciter current 8 a relay 3'' capable of short-circuiting the input terminals of the inverter 3 so that the exciter current 8 is able to rise rapidly to a certain maximum value. The voltage-dependent relay 3'', not illustrated in detail, is capable of dropping out automatically as soon as a certain output voltage 4 has been reached, whereafter the above described transistor-controlled regulator arrangement takes over. This regulator arrangement can operate not only depending on certain voltages but also in dependence on voltage and current values.

If, for instance, the load current is caused to flow through a small inductive or ohmic resistance, then the resulting voltage drop thereacross may additionally be applied to the inverter 6 whereby the desired regulation effect is obtained. Such an arrangement can also be used in connection with generators for charging batteries, for instance in motor vehicles. The transistor-controlled regulating arrangement according to the invention is also suitable for current and voltage regulation of rectifier circuits.

It will be understood that each of the elements described above, or two or more together, may also find a useful application in other types of transistor-controlled regulator arrangement differing from the type described above.

While the invention has been illustrated and described as embodied in transistor-controlled output regulator arrangement for direct current and alternating current circuits, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Transistor-controlled output regulator arrangement for direct current and alternating current circuits, comprising, in combination, electric energy generating means having output terminals for delivering output energy having variable electrical characteristics; first inverter means including at least one transistor connected with said output terminals and capable of producing an auxiliary current at a variable frequency depending on the characteristics of the output energy appearing at said output terminals; control circuit means connected with said energy output means for applying thereto a control current adapted to influence said characteristics of said output energy; second inverter means including at least one transistor connected with its output in said control circuit means for furnishing said control current and having control elements connected with the output of said first inverter means for regulating said control current depending upon the frequency of said auxiliary current produced by said first inverter means; and a frequency-dependent control element connected in the alternating current circuit of one of said inverters.

2. Transistor-controlled output regulator arrangement for direct current and alternating current circuits, comprising, in combination, electric energy generating means having output terminals for delivering output energy having variable electrical characteristics; first inverter means including at least one transistor connected with said output terminals and capable of producing an auxiliary current at a variable frequency depending on the characteristics of the output energy appearing at said output terminals; a voltage-responsive resistor means connected between said first inverter means and at least one of said output terminals and capable of substantial changes of its resistance in response to comparatively small variations of the output voltage of said generating means for producing correspondingly large frequency changes in said auxiliary current; control circuit means connected with said energy output means for applying thereto a control current adapted to influence said characteristics of said output energy; second inverter means including at least one transistor connected with its output in said control circuit means for furnishing said control current and having control elements connected with the output of said first inverter means for regulating said control current depending upon the frequency of said auxiliary current produced by said first inverter means; and a frequency-dependent control element connected in the alternating current circuit of one of said inverters.

3. Transistor-controlled output regulator arrangement for direct current and alternating current circuits, comprising, in combination, electric energy generating means having output terminals for delivering output energy having variable electrical characteristics; first inverter means including at least one transistor connected with said output terminals and capable of producing an auxiliary current at a variable frequency depending on the characteristics of the output energy appearing at said output terminals; a voltage-responsive controllable semiconductor means connected between said first inverter means and at least one of said output terminals and capable of substantial changes of its resistance in response to comparatively small variations of the output voltage of said generating means for producing correspondingly large frequency changes in said auxiliary current; control circuit means connected with said energy output means for applying thereto a control current adapted to influence said characteristics of said output energy; second inverter means including at least one transistor connected with its output in said control circuit means for furnishing said control current and having control elements connected with the output of said first inverter means for regulating said control current depending upon the frequency of said auxiliary current produced by said first inverter means; and a frequency-dependent control element connected in the alternating current circuit of one of said inverters.

No references cited.